United States Patent [19]
Gaul et al.

[11] Patent Number: 4,753,525
[45] Date of Patent: Jun. 28, 1988

[54] MODULAR DEVICE

[75] Inventors: Norbert Gaul, Solms-Oberbiel; Guenter Reinheimer, Biebertal; Peter Euteneuer, Lahnau, all of Fed. Rep. of Germany

[73] Assignee: Ernst Leitz Wetzlar GmbH, Wetzlar, Fed. Rep. of Germany

[21] Appl. No.: 19,375

[22] Filed: Feb. 26, 1987

[30] Foreign Application Priority Data

Mar. 29, 1986 [DE] Fed. Rep. of Germany ....... 3610692

[51] Int. Cl.⁴ .......................... G02B 21/06; G02B 7/00
[52] U.S. Cl. ...................................... 350/526; 350/528
[58] Field of Search ............... 350/315, 318, 321, 520, 350/526, 528

[56] References Cited

U.S. PATENT DOCUMENTS

| | | | |
|---|---|---|---|
| 3,028,483 | 4/1962 | Simmon | 350/318 |
| 3,873,182 | 3/1975 | Furuhashi | 350/520 |
| 3,918,793 | 11/1975 | Kraft . | |
| 3,955,788 | 5/1976 | Delage | 350/321 |
| 4,487,486 | 12/1984 | Hayasaka | 350/525 |
| 4,619,503 | 10/1986 | Reinheimer et al. | 350/511 |

FOREIGN PATENT DOCUMENTS

| | | |
|---|---|---|
| 2055944 | 5/1972 | Fed. Rep. of Germany . |
| 2316386 | 10/1974 | Fed. Rep. of Germany ...... 350/526 |
| 3230504 | 3/1983 | Fed. Rep. of Germany . |
| 460253 | 1/1937 | United Kingdom ................ 350/526 |
| 1,326,649 | 8/1973 | United Kingdom . |
| 1,447,166 | 8/1976 | United Kingdom . |
| 2,052,789 | 1/1981 | United Kingdom . |

*Primary Examiner*—William H. Punter
*Attorney, Agent, or Firm*—Foley & Lardner, Schwartz, Jeffery, Schwaab, Mack, Blumenthal & Evans

[57] ABSTRACT

A modular device (5) for an optical device, such as a microscope (1), is described. This device has adjacently disposed mountings (24a, 24b) for optical systems which can be introduced alternately into the illumination beam path (2) or optical axis (2a) of the microscope by use of a pull rod (11) provided on the modular device (5). At least one of the mountings (24a) is capable of being uncoupled from the pull rod (11), so that the relative spacing of two mountings (24a, 24b) can be altered. Additionally an optical element (17), for example, a compensating plate disposed in the microscope, can be pivoted into the optical axis (2a). By using the modular device (5), a rapid switch-over from traditional methods of microscopy to, for example, investigations utilizing fluorescence microscopy and vice versa, without any effect on the image section and the image sharpness, is possible without undertaking adapting operations or reconstructing the microscope.

19 Claims, 4 Drawing Sheets

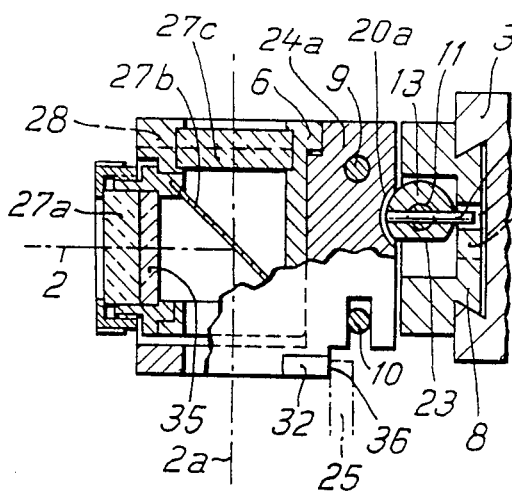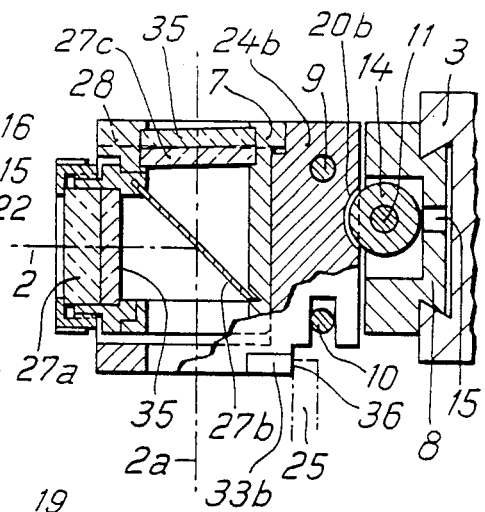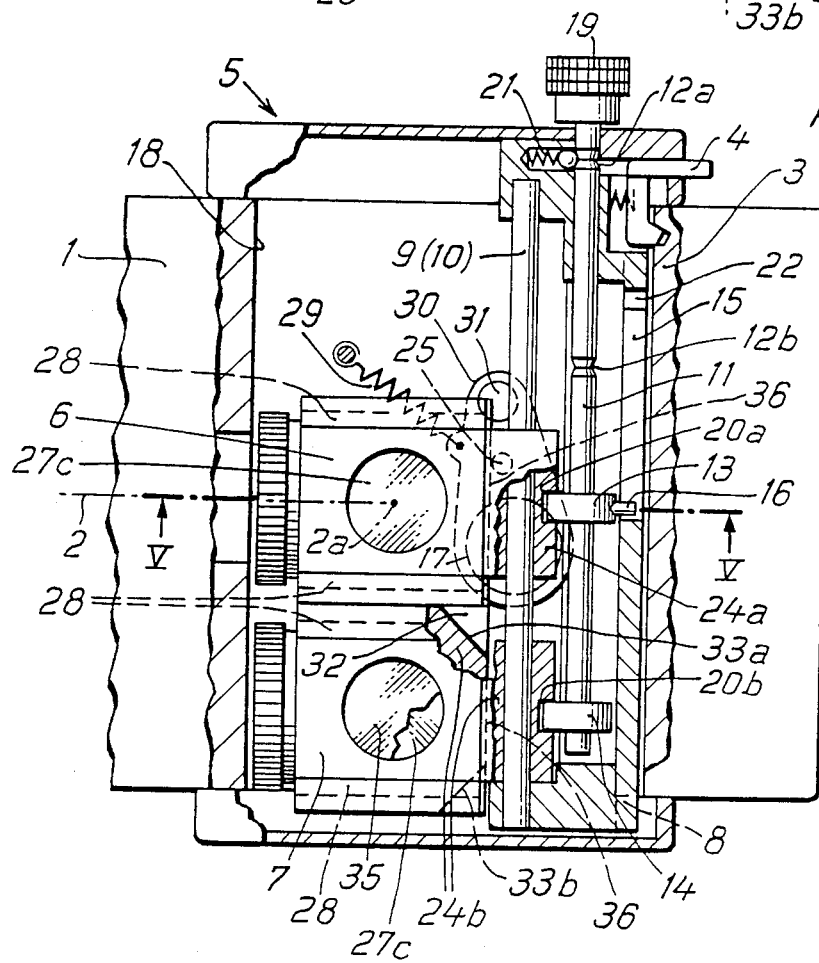

MODULAR DEVICE

BACKGROUND OF THE INVENTION

The invention relates to a modular device to receive and to introduce at least two optical systems into the beam path or into the optical axis of an optical device.

An exchangeable support for fluorescence units in an inverted microscope is known from German Offenlegungsschrift No. 3,230,504. The supports there are disposed adjacent one another and can be inserted alternately into the beam path by utilizing a gear-like arrangement. An alteration of the relative spacing between the provided fluorescence tubes is not possible with this known device.

From German Offenlegungsschrift No. 2,055,944, a fluorescence reflected light illuminator is known, in which the individual components are combined into a linear or curved slider, or are placed in a row in the manner of a link chain. The spacing between two neighboring components also cannot be altered in a controlled manner.

Finally, from German Patent Specification No. 2,316,386 discloses a fluorescence reflected light illuminator in which the components are fitted on an axial rotary support and can be introduced alternately into the beam path by gear means is known.

All three of these known arrangements suffer from the disadvantage that a controlled alteration of the relative spacing between two neighboring components is not possible.

Modern microscopes permit the performance of not only traditional microscopic investigation involving the use of reflected light, transmitted light, phase contrast, etc., but also of investigations utilizing fluorescence microscopy, particularly multiple fluorochrome sensitization processes, on a selective basis. It was formerly not possible to switch over rapidly from the traditional microscopic methods to the modern methods of investigation utilizing fluorescence microscopy—and vice versa—without undertaking more or less extensive rebuilding operations or adapting operations involving the microscope. Either the image selection focussed at the particular time, on the object to be investigated, became lost, or else the objective required refocussing.

SUMMARY OF THE INVENTION

It is accordingly the object of the present invention to overcome the disadvantages of the known prior art and to provide a modular device for optical equipment, which permits not only a rapid, selective bringing into a working position of functional units combined into individual components, but also, in addition, a rapid switchover, without reorganizing the equipment, in order to carry out such optical methods of investigation, in which the above-mentioned components are moved out of their working position.

An additional object of the present invention consists in being able to execute this exchange without the loss of the once-focussed image section and, above all, of the once-focussed image sharpness.

These objects are achieved by providing a modular device to interchangeably receive and to introduce into the beam path or optical axis of an optical device, at least two optical systems, the optical systems being posed adjacent one another and being constructed as both components and independent functional units, including:

means for retaining the modular device, wherein said device can be easily removed, means for interchanging the optical systems between a working position and a storing position, and means for altering the relative spacing of any two neighboring optical components.

BRIEF DESCRIPTION OF THE DRAWINGS

In the drawings:

FIG. 2 shows a top plan view of a modular device with filter components in a first position;

FIG. 4 shows a top plan view of the modular device in a third position with uncoupled filter components and with the compensating plate swung in;

FIG. 5 shows a sectional view through a first filter component taken along V—V of FIG. 2;

FIG. 6 shows a sectional view through a second modified filter component taken along VI—VI of FIG. 3;

DETAILED DESCRIPTION OF THE PREFERRED EMBODIMENTS

Figure 1:
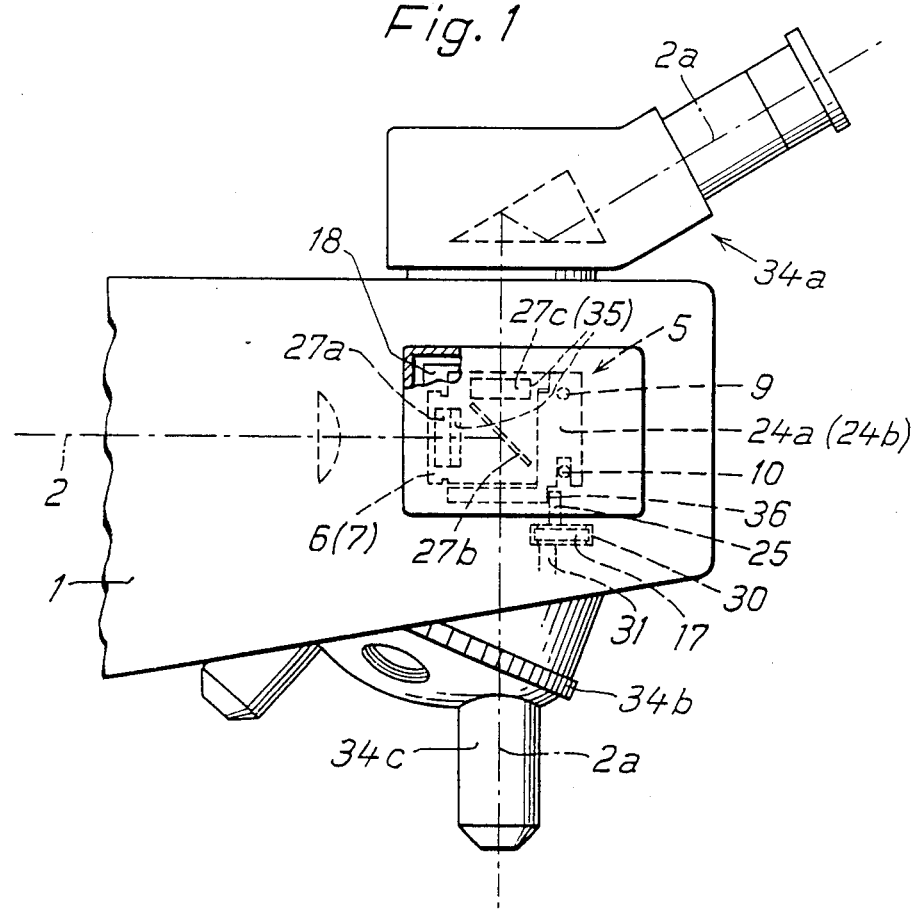
FIG. 1 shows a side elevation of a microscope with a sliding drawer as the modular device.

FIG. 1 shows schematically a part of a microscope 1 with an illumination beam path 2 and an optical axis 2a. A lens turret 34b with an objective lens 34c situated in its working position is secured to the underside of the microscope body. A binocular tube 34a with an associated optical axis 2a is disposed on the microscope 1. A sliding drawer 18, which serves to receive a modular device 5 in a support 3, is provided as shown in FIGS. 2-6. Moreover, FIG. 1 shows parts of the modular device 5 with a filter component 6 or 7, which in turn comprises an excitation filter 27a, a compensating plate 35, a dichromatic divider mirror 27b and a blocking filter 27c. A control cam 25, which is secured to a swivel plate 30 projects into the sliding drawer 18. Plate 30 is rotatably mounted by means of the swivel axle 31. Swivel plate 30 carries an optical element 17 constructed as a compensating plate.

FIG. 2 shows the modular device 5 as a closed component in a top plan view. Device 5 is secured by means of a blocking device 4 at the support 3. A pull rod 11, rotatably mounted on the modular device 5, is provided at one of its ends with a setting knob 19. The pull rod 11 has engagement grooves 12a and 12b, with which engagement means 21 is associated. FIG. 2 also shows a first entrainment element 13, mounted on pull rod 11, and a second entrainment element 14. A pin 16, which projects into a guide groove 15, is provided on the first entrainment element 13. At the end of guide groove 15, a recess 22 is connected. Two mountings 24a and 24b are also shown, which exhibit respective recesses 20a and 20b. The first entrainment element 13 is associated with the recess 20a, and the second entrainment element 14 with the recess 20b, and are positively connected to these associated recesses, 20a and 20b. The mountings 24a and 24b are guided on guide rods 9 and 10, disposed one above the other. Filter components 6 and 7 are fitted by means of a dovetail guide 28 in the associated mountings 24a and 24b in an exchangeable manner. In the embodiment shown, the filter component 6 is situated in a working position. The swivel plate 30 is shown together with the swivel axle 31 and the control cam 25. In this instance, swivel plate 30 is held against the force of a spring 29 by the control cam 25 at an edge 36 of the mountings 24a and 24b, respectively. Oppositely disposed oblique portions 33a and 33b are fitted at one of the ends of the mounting 24b.

Figure 3:
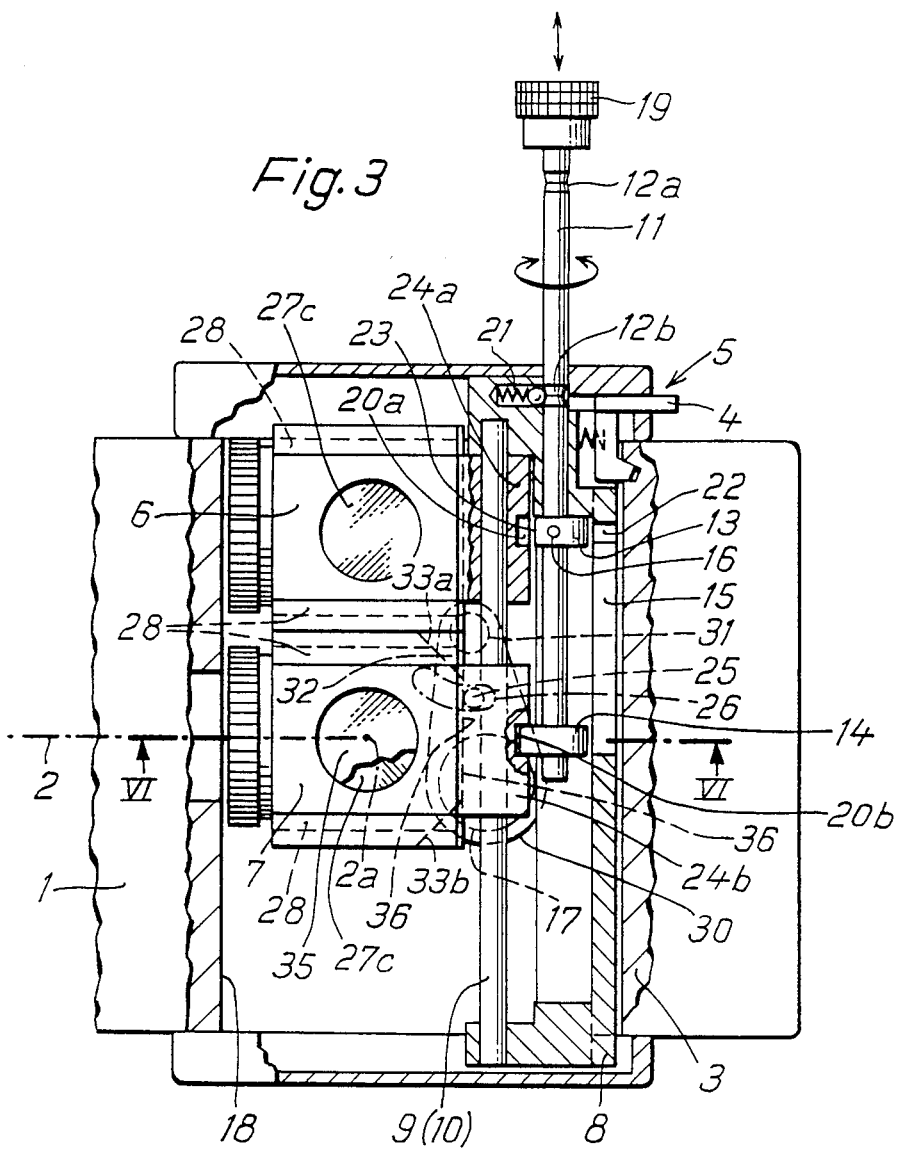
FIG. 3 shows a top plan view of the modular device with the filter components in a second position.

In a manner similar to FIG. 2, FIG. 3 shows the modular device 5 as a closed component, with filter component 7 having been introduced into the working position. In this arrangement, the engagement groove 12b of the pull rod 11 is engaged with engagement means 21. Additionally, the guiding of the control cam 25 in a curved control slot 26 is illustrated.

Figure 4:
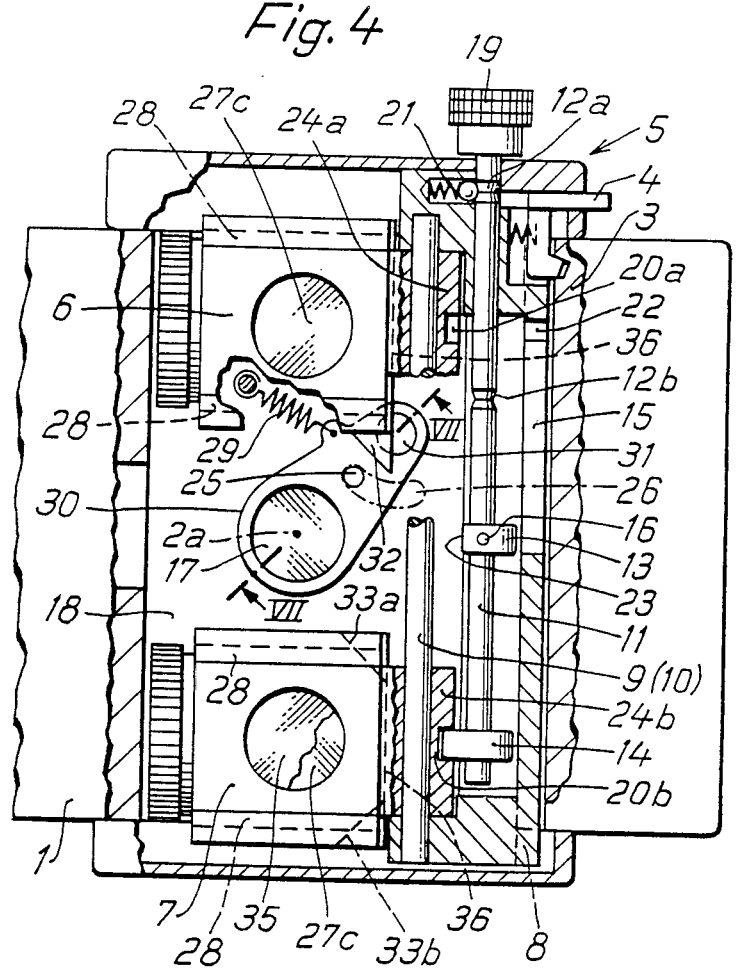

In FIG. 4, the modular device 5 is shown with swivel plate 30 brought into its working position. Mounting 24a is uncoupled from pull rod 11, and the relative spacing between mounting 24a and mounting 24b has been altered by insertion of pull rod 11. On mounting 24a, a projecting ramp 32 is shown (also shown in FIG. 9) which, in co-operation with inclined portion 33a disposed opposite to it, forms a continuation of the edge 36 on mounting 24b.

FIG. 5 shows a section along line V—V of FIG. 2 through the modular device 5, which is secured by means of a dovetail guide 8 in support 3. In this arrangement, the mounting 24a is shown with guide rods 9 and 10 disposed one above the other. The entrainment element 13, fitted on the pull rod 11, has a flattened portion 23. The filter component 6 in this instance is constructed as a fluorescence unit. It includes excitation filter 27a, which preferably is disposed perpendicular to the illumination beam path 2 of the microscope, compensating plate 35, dichromatic divider mirror 27b attached at 45° to the optical axis 2a of the microscope, and blocking filter 27c disposed perpendicular to the optical axis 2a.

In a manner similar to FIG. 5, FIG. 6 shows a section along line VI—VI of FIG. 3 through the modular device 5, with mounting 24b. In this case, blocking filter 27c and compensating plate 35 are not disposed perpendicular to the optical axis 2a of the microscope. As a result of this, any reflections which may possibly occur within the microscope are avoided.

Figure 7:
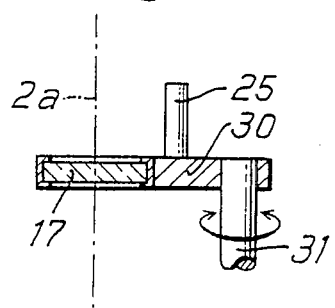
FIG. 7 shows a sectional view through the swivel plate taken along VII—VII at FIG. 4.

FIG. 7 shows swivel plate 30 together with optical element 17, which is constructed as a compensating plate and which is disposed perpendicular to the optical axis 2a, control cam 25 and swivel axle 31.

Figure 8:
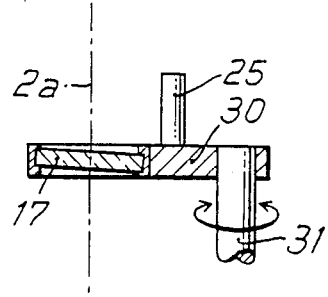
FIG. 8 shows a sectional view through a modified swivel plate taken along the line VII—VII of FIG. 4.

In a manner similar to FIG. 7, FIG. 8 shows optical element 17 when it is not disposed perpendicular to optical axis 2a. This arrangement has the advantage that any reflections possibly occurring within the microscope are avoided.

Figure 9:
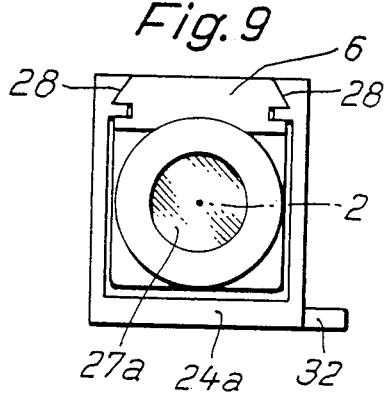
FIG. 9 shows a front elevation of the filter component of FIG. 5 situated in its working position, as in FIG. 2, and its mounting (24a) viewed along the illumination beam path of the microscope.

FIG. 9 shows mounting 24a with projecting ramp 32 in front elevation, i.e. from the viewing direction of the light source (not shown) for the illumination beam path 2. In this instance, filter component 6 can be introduced into mounting 24a by means of dovetail guide 28. A problem-free exchange of various filter components is assured by the use of dovetail guide 28.

The method of operation of a device according to the present invention is as follows: the modular device 5 is introduced, by means of the attached dovetail guide 8 (FIG. 5), into the support 3 in the sliding drawer 18 (FIG. 1) of the microscope 1 and secured by means of a blocking device 4 against displacement. When the modular device 5 is introduced into the sliding drawer 18, the control cam 25 of the swivel plate 30 is held by the inclined portion 33b, against the force of the spring 29 at the edge 36 of the mountings 24a and 24b, and thus the swivel plate 30, together with element 17, is pivoted out of the optical axis 2a of the microscope body 1. As can be seen from FIG. 2, the engagement means 21 is situated in engagement with the engagement groove 12a; in this position, the mounting 24a together with the pertinent filter component 6 is accurately positioned in the illumination beam path 2 and in the optical axis 2a of the microscope (setting position A). As can be seen from FIG. 3, by pulling out the pull rod 11 and engaging engagement means 21 in the engagement groove 12b, the filter component 7 is accurately positioned in the illumination beam path 2 and in the optical axis 2a of the microscope (setting position B). In this position, the pin 16 on first entrainment element 13 is situated in the recess 22 connecting with the guide groove 15.

By rotating the setting knob 19 in a clockwise direction, the pin 16 is swung out via the recess 22 from the guide groove 15. At the same time, the positive connection of the mounting 24a and the entrainment element 13 is rendered ineffective by means of the flattened portion 23 on entrainment element 13. By pushing in the pull rod 11 (FIG. 4), only the filter component 7 is now displaced and moved out of the illumination beam path 2 and the optical axis 2a of the microscope. During this procedure, the filter component 6 remains fixed in its position by means of an engagement means (not shown). If just the filter component 7 is displaced, then the control cam 25 slides initially along the edge 36 of the mounting 24b. The control cam 25 is then guided by the control curve 26, due to the inclined portion 33a by the force of the spring 29, in order to assure an introduction with precise positioning of the swivel plate 30, with the optical element 17 constructed as a compensating plate, into the optical axis 2a of the microscope. This setting of the swivel plate 30 permits a rapid switchover to other types of microscopy. The optical element 17 is designed in such a manner that the set image section does not become lost, and the objective lens 34c does not require refocussing (setting position C).

When it is desired to move swivel plate 30 (FIG. 4) out of the optical axis 2a of the microscope again, pull rod 11 is pulled and the control cam 25 is guided by the inclined portion 33a to the edge 36 of the mounting 24b.

The excitation filter 27a shown in FIGS. 5 and 6 and the blocking filters 27c are provided with a compensating plate 35. This has the advantage that by means of the compensating plate 35 a multiplicity of possible filter combinations are possible without any effect on the optical paths 2 and 2a of the microscope.

Naturally, the modular device can also have several mountings; in this event, any types and combinations of optical elements, such as for example filters, lenses, graticules, aperture stops, etc., can be brought into the working position.

While the invention has been described in reference to various embodiments, it is understood that many modifications and improvements may be made by those skilled in the art without departing from the scope of the novel concepts and teachings of the present invention.

What is claimed is:

1. A modular device for receiving and selectively introducing one of at least two adjacently arranged optical systems into an optical beam path of an optical instrument, wherein said optical systems are constructed as separate, interchangeable functional components, said device comprising an adjusting element provided with at least two displaceable mountings for receiving the interchangeable functional components of said optical systems, said displaceable mountings being displaceable either together with each other in the same direction or relative to each other in opposite directions with respect to said optical beam path; and means for altering the relative spacing of the functional components of optical systems received in said mountings comprising means for selectively uncoupling at least one of said mountings from said adjusting element.

2. A device as claimed in claim 23, wherein said adjusting element comprises a pull rod, and
said optical systems are constructed as separate filter components.

3. A device as claimed in claim 2, wherein entrainment elements fixedly attached to the pull rod are provided, and each of said entrainment elements is connected to an associated one of said mountings by a positive connection.

4. A device as claimed in claim 3, wherein at least one entrainment element has a pin attached to it, said pin being guided in a guide groove.

5. A device as claimed in claim 4, wherein said one entrainment element has a flattened portion to deactuate the positive connection between said one entrainment element and the associated mounting.

6. A device as claimed in claim 2, wherein an optical element is brought via a guide slot and a resilient means into a working position when none of said filter components is situated in said optical axis or beam path of said optical instrument.

7. A device as claimed in claim 6, wherein a compensating plate is provided as said optical element, said compensating plate is brought into said working position simultaneously with the alteration of the relative spacing of said filter components.

8. A device as claimed in claim 7, wherein the angle between said compensating plate and said optical axis of said optical instrument differs from 90°.

9. A device as claimed in claim 2, wherein said filter components each comprise an excitation filter, a dichromatic divider mirror, and a blocking filter.

10. A device as claimed in claim 9, wherein said dichromatic divider mirror is disposed at a 45° angle in relation to said optical axis of said optical instrument.

11. A device as claimed in claim 9, wherein at least one of said filters are connected to a compensating plate.

12. A device as claimed in claim 9, wherein the angle between said blocking filter and said optical axis of said optical instrument differs from 90°.

13. A device as claimed in claim 11, wherein the angle between said blocking filter and said optical axis of said optical device differs from 90°.

14. A method for selectively introducing into the beam path or optical axis of an optical instrument one of at least two alternate optical systems constructed as separate, interchangeable functional components, said method comprising the steps of:

providing an adjusting element with at least two displaceable mountings in which the interchangeable functional components of said optical systems are received adjacent each other; said mountings being selectively displaceable relative to each other in opposite directions or together with each other in the same direction; at least one of said mountings being capable of being uncoupled from said adjusting element;

selectively actuating said adjusting element to displace said mountings together relative to said beam path or optical axis in order to position a desired one of said functional components in said beam path or optical axis; and uncoupling one of said mountings from said adjusting element and actuating said adjusting element to displace the other mounting relative to said one mounting and alter the relative spacing between the functional components of said two optical systems.

15. A method as claimed in claim 14, wherein said adjusting element comprises a pull rod, and
said optical systems are constructed as separate filter components.

16. A method as claimed in claim 15, wherein entrainment elements fixedly fitted on the pull rod are provided, and said entrainment elements are connected to said mountings by a positive connection.

17. A method as claimed in claim 15, wherein engagement grooves are provided, which in cooperation with an engagement means assures a defined introduction of the filter components into said beam path or said optical axis of said optical instrument.

18. A method as claimed in claim 15, wherein said filter components include an excitation filter, a dichromatic divider mirror, and a blocking filter.

19. A method as claimed in claim 18, wherein said dichromatic divider mirror stands at a 45° angle in relation to said optical axis of said optical instrument.

* * * * *

UNITED STATES PATENT AND TRADEMARK OFFICE
CERTIFICATE OF CORRECTION

PATENT NO. : 4,753,525
DATED : June 28, 1988
INVENTOR(S) : Norbert GAUL; Guenter REINHEIMER and Peter EUTENEUER It is certified that error appears in the above—identified patent and that said Letters Patent is hereby corrected as shown below:

On the Title Page, Item [54], should read -- MODULAR DEVICE FOR RECEIVING AND SELECTIVELY INTRODUCING OPTICAL SYSTEMS INTO AN OPTICAL BEAM PATH OF AN OPTICAL INSTRUMENT --.

Claim 2, line 1, "23" should read -- 1 --.

Claim 13, line 3, "device" should read -- instrument --.

Signed and Sealed this

Twenty-first Day of February, 1989

Attest:

DONALD J. QUIGG

*Attesting Officer*  *Commissioner of Patents and Trademarks*